(12) United States Patent
Sai et al.

(10) Patent No.: US 11,867,432 B2
(45) Date of Patent: Jan. 9, 2024

(54) GEOTHERMAL HEAT UTILIZATION SYSTEM AND OPERATION METHOD FOR GEOTHERMAL HEAT UTILIZATION SYSTEM

(71) Applicants: MITSUBISHI HEAVY INDUSTRIES THERMAL SYSTEMS, LTD., Tokyo (JP); University Public Corporation Osaka, Osaka (JP)

(72) Inventors: Rinnichi Sai, Tokyo (JP); Masanobu Sakai, Tokyo (JP); Toru Yamaguchi, Tokyo (JP); Masaki Nakao, Osaka (JP); Yasuhisa Nakaso, Osaka (JP)

(73) Assignees: MITSUBISHI HEAVY INDUSTRIES THERMAL SYSTEMS, LTD., Tokyo (JP); UNIVERSITY PUBLIC CORPORATION OSAKA, Osaka (JP)

( * ) Notice: Subject to any disclaimer, the term of this patent is extended or adjusted under 35 U.S.C. 154(b) by 509 days.

(21) Appl. No.: 17/267,414

(22) PCT Filed: Aug. 14, 2019

(86) PCT No.: PCT/JP2019/031911
§ 371 (c)(1),
(2) Date: Feb. 9, 2021

(87) PCT Pub. No.: WO2020/036186
PCT Pub. Date: Feb. 20, 2020

(65) Prior Publication Data
US 2021/0293456 A1 Sep. 23, 2021

(30) Foreign Application Priority Data
Aug. 14, 2018 (JP) .................................. 2018-152611

(51) Int. Cl.
*F24T 10/20* (2018.01)
*F24T 10/30* (2018.01)

(52) U.S. Cl.
CPC .............. *F24T 10/20* (2018.05); *F24T 10/30* (2018.05)

(58) Field of Classification Search
CPC ....... F24T 10/13; F24T 10/20; F24T 2010/56; Y02B 10/40; Y02B 10/10
See application file for complete search history.

(56) References Cited

U.S. PATENT DOCUMENTS 2,461,449 A * 2/1949 Smith ..................... F24T 10/30
166/57
4,157,730 A * 6/1979 Despois .............. F28D 20/0056
165/45

(Continued)

FOREIGN PATENT DOCUMENTS

JP 9-280689 A 10/1997

OTHER PUBLICATIONS

International Search Report and Written Opinion of the International Searching Authority for International Application No. PCT/JP2019/031911, dated Oct. 8, 2019, with English translation.

*Primary Examiner* — Nelson J Nieves
(74) *Attorney, Agent, or Firm* — Birch, Stewart, Kolasch & Birch, LLP

(57) ABSTRACT

A geothermal heat utilization system includes a first well having a first upper opening and a first lower opening, and a second well having a second upper opening and a second lower opening. The geothermal heat utilization system further includes a first pipe, a second pipe, a first heat exchanger, and a second heat exchanger. The geothermal heat utilization system is capable of supplying underground water of an upper aquifer from the first upper opening to the second upper opening via the first pipe, and the geothermal (Continued)

heat utilization system is capable of supplying underground water of a lower aquifer from the second lower opening to the first lower opening via the second pipe.

5 Claims, 18 Drawing Sheets

(56) References Cited

U.S. PATENT DOCUMENTS

| | | | | |
|---|---|---|---|---|
| 4,200,152 | A * | 4/1980 | Foster | E21B 43/283 |
| | | | | 166/308.1 |
| 4,201,060 | A * | 5/1980 | Outmans | F03G 7/04 |
| | | | | 165/45 |
| 4,223,729 | A * | 9/1980 | Foster | E21B 43/17 |
| | | | | 166/250.1 |
| 4,448,237 | A * | 5/1984 | Riley | F24D 11/0214 |
| | | | | 165/45 |
| 8,881,805 | B2 * | 11/2014 | Klemencic | F24T 10/20 |
| | | | | 166/245 |
| 9,080,441 | B2 * | 7/2015 | Meurer | E21B 43/2401 |
| 9,518,787 | B2 * | 12/2016 | Pilebro | F24D 3/08 |
| 10,054,372 | B2 * | 8/2018 | Vendeirinho | F24D 11/006 |
| 10,107,563 | B2 * | 10/2018 | Bergan | F24S 60/30 |
| 11,624,510 | B2 * | 4/2023 | Rosén | F24F 5/0046 |
| | | | | 165/45 |
| 2006/0048770 | A1 * | 3/2006 | Meksvanh | F24T 10/20 |
| | | | | 126/620 |
| 2011/0082592 | A1 * | 4/2011 | Saito | F24T 10/20 |
| | | | | 454/239 |
| 2012/0198844 | A1 * | 8/2012 | Kaminsky | F24T 10/20 |
| | | | | 165/45 |
| 2013/0056171 | A1 * | 3/2013 | Klemencic | F24T 10/30 |
| | | | | 165/45 |
| 2013/0299123 | A1 * | 11/2013 | Matula | F25D 17/00 |
| | | | | 165/45 |
| 2015/0292809 | A1 * | 10/2015 | Pilebro | F28D 20/0039 |
| | | | | 165/10 |
| 2018/0283799 | A1 * | 10/2018 | Sakai | F24F 11/30 |
| 2021/0164708 | A1 * | 6/2021 | Niemi | F24T 10/17 |
| 2021/0332683 | A1 * | 10/2021 | Hunter | E21B 47/003 |

* cited by examiner

FIG. 4 WINTER OPERATION END TIME

FIG. 5 SUMMER OPERATION START TIME

FIG. 6  SUMMER OPERATION END TIME

FIG. 7

| TYPE | S-ATES | W-ATES | QW-ATES |
|---|---|---|---|
| PERIOD WATER INJECTION RADIUS r | r | 0.7r | r |
| INTER-WELL DISTANCE AT WHICH WATER INJECTION DOES NOT INTERFERE | 2r | 1.4r | r |

| TYPE | S-ATES | W-ATES | QW-ATES |
|---|---|---|---|
| PERIOD WATER INJECTION RADIUS | r | r | 2r |
| PERIOD CUMULATIVE WATER INJECTION AMOUNT V | s | 2s | 4s |

GEOTHERMAL HEAT UTILIZATION SYSTEM AND OPERATION METHOD FOR GEOTHERMAL HEAT UTILIZATION SYSTEM

TECHNICAL FIELD

The present invention relates to a geothermal heat utilization system and an operation method for the geothermal heat utilization system.

Priority is claimed on Japanese Patent Application No. 2018-152611, filed Aug. 14, 2018, the content of which is incorporated herein by reference.

BACKGROUND ART

In recent years, a geothermal heat utilization system that pumps up underground water in an aquifer from a well and uses the underground water as a hot heat source or a cold heat source has been proposed.

In the related art, Patent Literature 1 discloses a geothermal heat utilization system that takes in underground water from an upper aquifer and circulates the underground water to a lower aquifer in an opening of a well.

CITATION LIST

Patent Literature

[Patent Literature 1]
Japanese Unexamined Patent Application, First Publication No. H09-280689

SUMMARY OF INVENTION

Technical Problem

However, in a case in which the quality of the underground water in the upper aquifer and the quality of the underground water in the lower aquifer are different, when the geothermal heat utilization system as in Patent Literature 1 is used, the underground water in the upper aquifer and the underground water in the lower aquifer are mixed with each other. When the underground water in the upper aquifer and the underground water in the lower aquifer are mixed with each other, the resulting reactants may block the opening of the well.

An object of the present invention is to provide a geothermal heat utilization system and an operation method for a geothermal heat utilization system in which blockage of the well can be prevented when the upper aquifer and the lower aquifer are used.

Solution to Problem

A geothermal heat utilization system according to a first aspect includes a first well that includes a first upper opening that opens in an upper aquifer and a first lower opening that opens in a lower aquifer; a second well that includes a second upper opening that opens in the upper aquifer and a second lower opening that opens in the lower aquifer; a first pipe; a second pipe; a first heat exchanger connected to the first pipe; and a second heat exchanger connected to the second pipe, wherein the geothermal heat utilization system is capable of supplying underground water of the upper aquifer from the first upper opening to the second upper opening via the first pipe, and wherein the geothermal heat utilization system is capable of supplying underground water of the lower aquifer from the second lower opening to the first lower opening via the second pipe.

According to the present aspect, the geothermal heat utilization system can supply the underground water of the upper aquifer and the underground water of the lower aquifer separately, and thus can prevent the underground water of the upper aquifer and the underground water of the lower aquifer from being mixed with each other.

Thus, in the geothermal heat utilization system of the present aspect, blockage of the well is prevented when the upper aquifer and the lower aquifer are used.

A geothermal heat utilization system according to a second aspect is the geothermal heat utilization system according to the first aspect, wherein the geothermal heat utilization system is configured to store hot water in one of the upper aquifer and the lower aquifer in summer, and wherein the geothermal heat utilization system is configured to store cold water in the other of the upper aquifer and the lower aquifer in winter.

According to the present aspect, water injection areas of hot water and cold water are unlikely to overlap. Therefore, the water injection area of each aquifer can be increased.

Further, the generation of a short circuit between the first well and the second well is prevented. Therefore, the geothermal heat utilization system of the present aspect can prevent heat storage loss.

A geothermal heat utilization system according to a third aspect is the geothermal heat utilization system according to the first or second aspect, wherein the geothermal heat utilization system is further capable of supplying underground water of the upper aquifer from the second upper opening to the first upper opening via the second pipe, and wherein the geothermal heat utilization system is further capable of supplying underground water of the lower aquifer from the first lower opening to the second lower opening via the first pipe.

According to the present aspect, the geothermal heat utilization system can reversely supply the heat stored by water supplying in each of the upper aquifer and the lower aquifer. Therefore, the heat stored by water supplying can be used.

A geothermal heat utilization system according to a fourth aspect is the geothermal heat utilization system according to any one of the first to third aspects, wherein the first well further includes a first storage unit provided above the first upper opening and including a first pump, and a first switching unit capable of switching between a mode for connecting the first storage unit and the first upper opening and a mode for connecting the first storage unit and the first lower opening, and wherein the second well further includes a second storage unit provided above the second upper opening and including a second pump, and a second switching unit capable of switching between a mode for connecting the second storage unit and the second upper opening and a mode for connecting the second storage unit and the second lower opening.

According to the present aspect, the first pump can pump the underground water of the upper aquifer and the underground water of the lower aquifer. Similarly, according to the present aspect, the second pump can pump the underground water of the upper aquifer and the underground water of the lower aquifer. Therefore, the utilization efficiency of the pump in each well can be improved.

An operation method for a geothermal heat utilization system according to a fifth aspect is provided, the system including a first well that includes a first upper opening that opens in an upper aquifer and a first lower opening that opens in a lower aquifer; a second well that includes a second upper opening that opens in the upper aquifer and a second lower opening that opens in the lower aquifer; a first pipe; a second pipe; a first heat exchanger connected to the first pipe; and a second heat exchanger connected to the second pipe, the method including a step of supplying underground water of the upper aquifer from the first upper opening to the second upper opening via the first pipe; and a step of supplying underground water of the lower aquifer from the second lower opening to the first lower opening via the second pipe.

According to the operation method for a geothermal heat utilization system of the present aspect, the underground water of the upper aquifer and the underground water of the lower aquifer can be supplied separately, and thus the underground water of the upper aquifer and the underground water of the lower aquifer can be prevented from being mixed with each other. Thus, in the operation method for a geothermal heat utilization system of the present aspect, blockage of the well is prevented when the upper aquifer and the lower aquifer are used.

Advantageous Effects of Invention

According to one aspect of the present invention, blockage of the well is prevented when the upper aquifer and the lower aquifer are used.

BRIEF DESCRIPTION OF DRAWINGS

FIG. 7 is a table for comparing a period water injection radius and an inter-well distance of each type.

DESCRIPTION OF EMBODIMENTS

Figure 1:
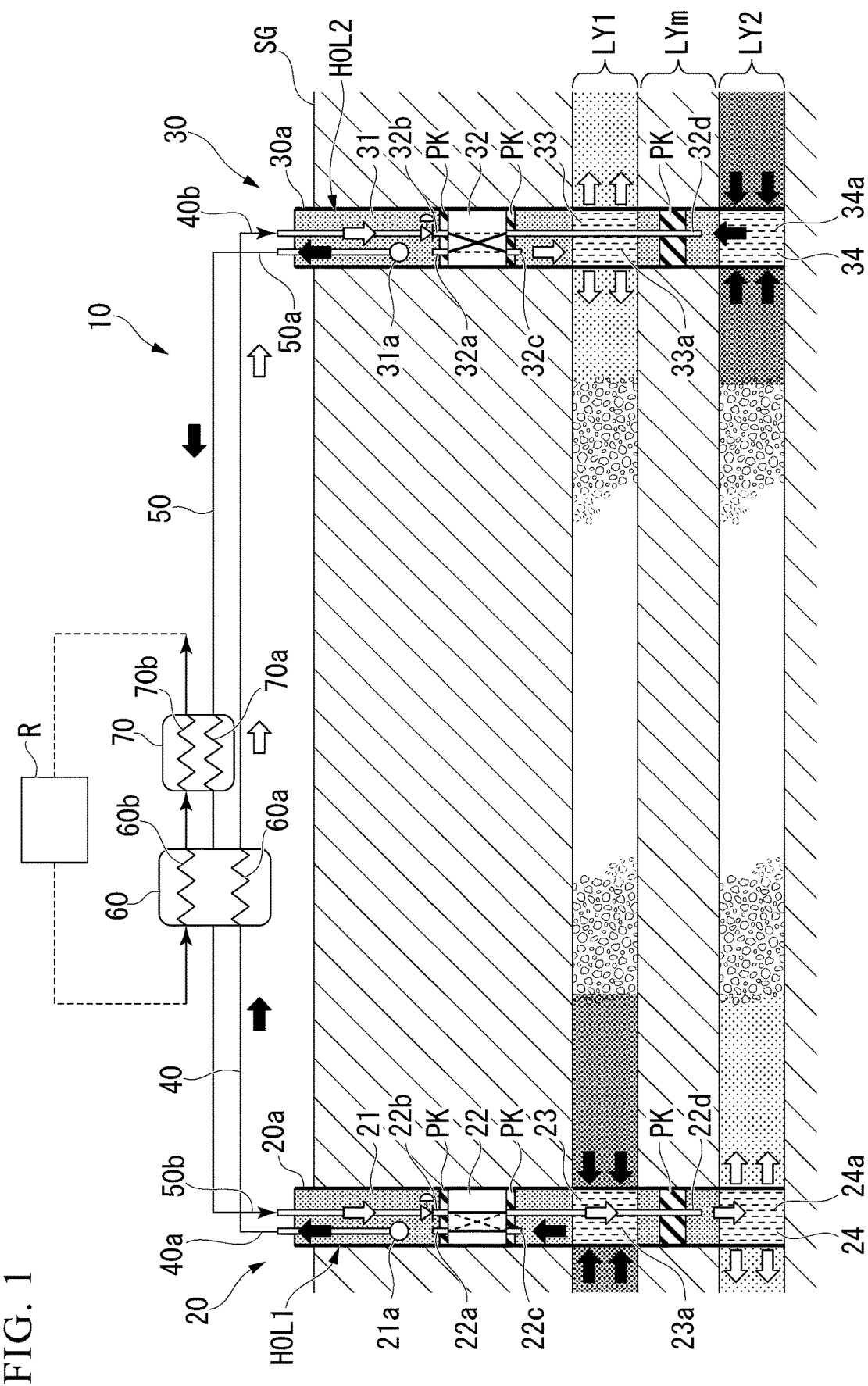
FIG. 1 is a system diagram of a geothermal heat utilization system according to a first embodiment of the present invention.

Hereinafter, embodiments according to the present invention will be described using the accompanying drawings. The same or corresponding configurations are designated by the same reference numerals in all drawings, and common description will be omitted.

First Embodiment

A first embodiment of a geothermal heat utilization system according to the present invention will be described with reference to FIGS. 1 and 2.

Figure 2:
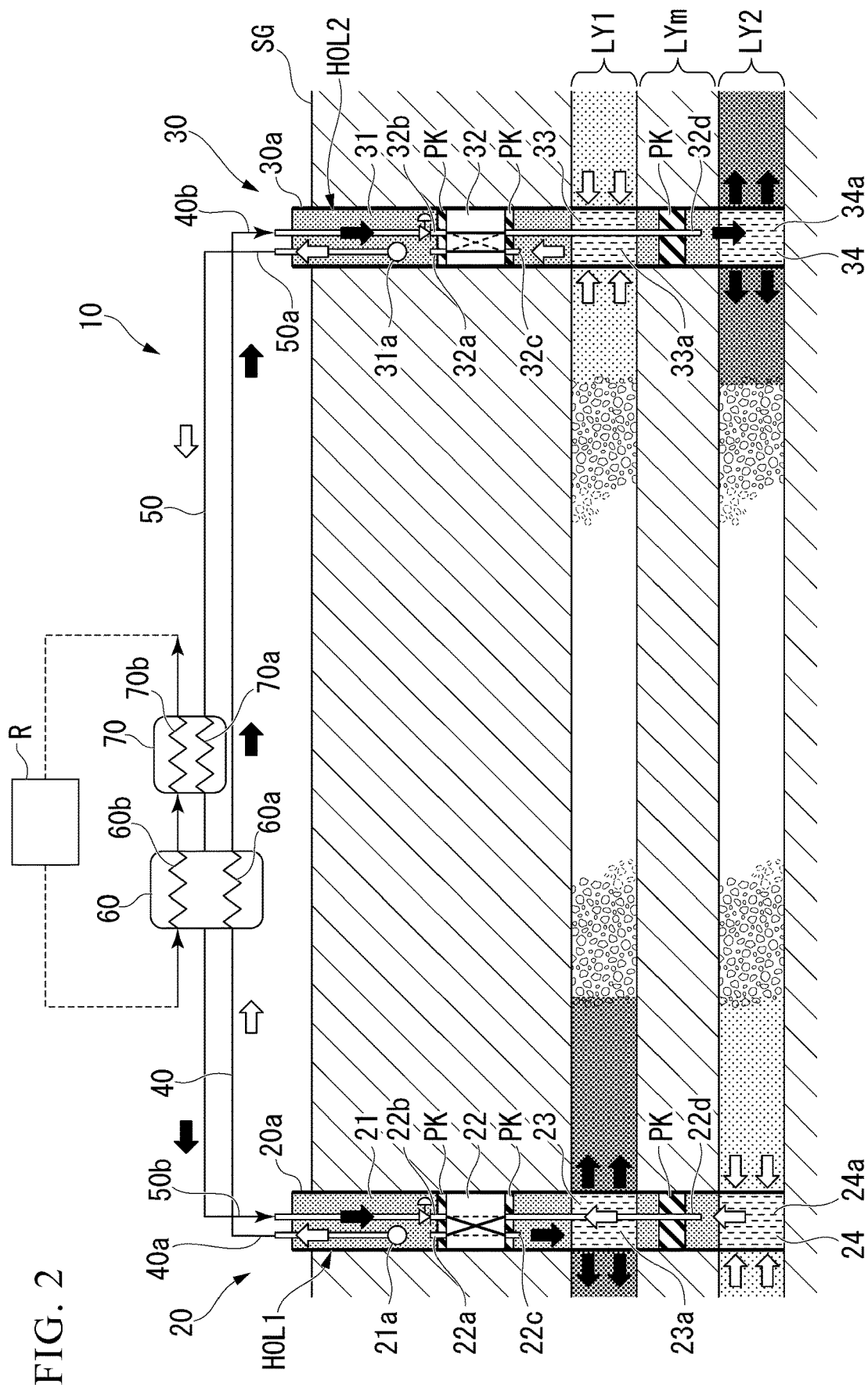
FIG. 2 is a system diagram of the geothermal heat utilization system according to the first embodiment of the present invention.

The arrows shown in FIGS. 1 and 2 indicate the flow of a refrigerant (including underground water) in each portion.

(Configuration of Geothermal Heat Utilization System)

A geothermal heat utilization system 10 stores heat in two different aquifers, an upper aquifer LY1 and a lower aquifer LY2. The upper aquifer LY1 and the lower aquifer LY2 are formed, for example, with a diluvial clay layer LYm interposed therebetween.

As shown in FIG. 1, the geothermal heat utilization system 10 includes a first well 20 and a second well 30.

The geothermal heat utilization system 10 further includes a first pipe 40, a second pipe 50, a first heat exchanger 60, and a second heat exchanger 70.

(Configuration of First Well)

The first well 20 is a well that penetrates the upper aquifer LY1 and extends to the lower aquifer LY2 from above ground to underground. The first well 20 includes a first storage unit 21, a first switching unit 22, a first upper opening 23, and a first lower opening 24.

The first well 20 includes a casing 20a embedded in an excavation hole HOL1 obtained by excavating underground from a ground surface SG to the lower aquifer LY2.

In the casing 20a, packings PK are provided between the first storage unit 21, the first switching unit 22, the first upper opening 23, and the first lower opening 24 and prevent the flow of the underground water between them.

The first storage unit 21 is provided above the first upper opening 23.

The first storage unit 21 has a first pump 21a capable of pumping the underground water in the first storage unit 21.

The first switching unit 22 is provided between the first storage unit 21 and the first upper opening 23.

The first switching unit 22 includes a first port 22a that opens to the first storage unit 21 and a second port 22b that is connected to the second pipe 50.

The first switching unit 22 further includes a third port 22c that opens to the first upper opening 23, and a fourth port 22d that passes through the first upper opening 23, extends toward the first lower opening 24, and opens to the first lower opening 24.

The first switching unit 22 is capable of switching between a mode for connecting the first storage unit 21 and the first upper opening 23 and a mode for connecting the first storage unit 21 and the first lower opening 24 by switching internal pipes thereof.

For example, in the case of FIG. 1, the first switching unit 22 connects the first storage unit 21 and the first upper opening 23 to each other by connecting the first port 22a and the third port 22c to each other.

Further, in the case of FIG. 1, the first switching unit 22 connects the second pipe and the first lower opening 24 to each other by connecting the second port 22b and the fourth port 22d to each other.

The first upper opening 23 opens in the upper aquifer LY1.

The first upper opening 23 is a portion of the first well 20 located at a depth corresponding to the upper aquifer LY1.

The underground water is stored in the first upper opening 23.

For example, the casing 20a is provided with a strainer 23a constituted by a plurality of slits in the upper aquifer LY1. The first upper opening 23 is configured such that the underground water in the upper aquifer LY1 can be taken into the inside of the casing 20a and the underground water can be returned to the upper aquifer LY1 from the inside of the casing 20a via the strainer 23a.

The first lower opening 24 opens in the lower aquifer LY2.

The first lower opening 24 is a portion of the first well 20 located at a depth corresponding to the lower aquifer LY2.

The underground water is stored in the first lower opening 24.

The first upper opening 23 and the first lower opening 24 are arranged vertically.

For example, the casing 20a is provided with a strainer 24a constituted by a plurality of slits in the lower aquifer LY2. The first lower opening 24 is configured such that the underground water in the lower aquifer LY2 can be taken into the inside of the casing 20a and the underground water can be returned to the lower aquifer LY2 from the inside of the casing 20a via the strainer 24a.

(Configuration of Second Well)

The second well 30 is a well that penetrates the upper aquifer LY1 and extends to the lower aquifer LY2 from above ground to underground.

The second well 30 is provided at a predetermined distance from the first well 20.

The second well 30 includes a second storage unit 31, a second switching unit 32, a second upper opening 33, and a second lower opening 34.

The second well 30 includes a casing 30a embedded in an excavation hole HOL2 obtained by excavating the underground from a ground surface to the lower aquifer LY2.

In the casing 30a, packings PK are provided between the second storage unit 31, the second switching unit 32, the second upper opening 33, and the second lower opening and prevent the flow of the underground water between them.

The second storage unit 31 is provided above the second upper opening 33.

The second storage unit 31 has a second pump 31a capable of pumping the underground water in the second storage unit 31.

The second switching unit 32 is provided between the second storage unit 31 and the second upper opening 33.

The second switching unit 32 includes a first port 32a that opens to the second storage unit 31 and a second port 32b that is connected to the first pipe 40.

The second switching unit 32 further includes a third port 32c that opens to the second upper opening 33, and a fourth port 32d that passes through the second upper opening 33, extends toward the second lower opening 34, and opens to the second lower opening 34.

The second switching unit 32 is capable of switching between a mode for connecting the second storage unit 31 and the second upper opening 33 and a mode for connecting the second storage unit 31 and the second lower opening 34 by switching internal pipes thereof.

For example, in the case of FIG. 1, the second switching unit 32 connects the second storage unit 31 and the second lower opening 34 to each other by connecting the first port 32a and the fourth port 32d to each other.

Further, in the case of FIG. 1, the second switching unit 32 connects the first pipe and the second upper opening 33 to each other by connecting the second port 32b and the third port 32c to each other.

The second upper opening 33 opens in the upper aquifer LY1.

The second upper opening 33 is a portion of the second well 30 located at a depth corresponding to the upper aquifer LY1.

The underground water is stored in the second upper opening 33.

For example, the casing 30a is provided with a strainer 33a constituted by a plurality of slits in the upper aquifer LY1. The second upper opening 33 is configured such that the underground water in the upper aquifer LY1 can be taken into the inside of the casing 30a and the underground water can be returned to the upper aquifer LY1 from the inside of the casing 30a via the strainer 33a.

The second lower opening 34 opens in the lower aquifer LY2.

The second lower opening 34 is a portion of the second well 30 located at a depth corresponding to the lower aquifer LY2.

The underground water is stored in the second lower opening 34.

The second upper opening 33 and the second lower opening 34 are arranged vertically.

For example, the casing 30a is provided with a strainer 34a constituted by a plurality of slits in the lower aquifer LY2. The second lower opening 34 is configured such that the underground water in the lower aquifer LY2 can be taken into the inside of the casing 30a and the underground water can be returned to the lower aquifer LY2 from the inside of the casing 30*a* via the strainer 34*a*.

(Configuration of First Pipe)

The first pipe 40 extends from a first end 40*a* to a second end 40*b* via a primary side (a primary side pipe 60*a*) of the first heat exchanger 60.

The first end 40*a* of the first pipe 40 is connected to the first pump 21*a* such that water can be pumped from the first pump 21*a* to the first pipe 40.

The first end 40*a* of the first pipe 40 extends into the first well 20 toward the first pump 21*a*.

The second end 40*b* of the first pipe 40 is connected to the second port 32*b* of the second switching unit 32 via an opening and closing valve, a check valve, or the like such that the water can be supplied toward the second port 32*b* of the second switching unit 32.

The second end 40*b* of the first pipe 40 extends into the second well 30 toward the second port 32*b* of the second switching unit 32.

(Configuration of Second Pipe)

The second pipe 50 extends from a first end 50*a* to a second end 50*b* via a primary side (a primary side pipe 70*a*) of the second heat exchanger 70.

The first end 50*a* of the second pipe 50 is connected to the second pump 31*a* such that water can be pumped from the second pump 31*a* to the second pipe 50.

The first end 50*a* of the second pipe 50 extends into the second well 30 toward the second pump 31*a*.

The second end 50*b* of the second pipe 50 is connected to the second port 22*b* of the first switching unit 22 via an opening and closing valve, a check valve, or the like such that the water can be supplied toward the second port 22*b* of the first switching unit 22.

The second end 50*b* of the second pipe 50 extends into the first well 20 toward the second port 22*b* of the first switching unit 22.

(Configuration of First Heat Exchanger)

The primary side (the primary side pipe 60*a*) of the first heat exchanger 60 is connected in the middle of the first pipe 40.

A secondary side (a secondary side pipe 60*b*) of the first heat exchanger 60 is connected to a load R such as an air conditioner.

The first heat exchanger 60 can exchange heat between the primary side and the secondary side.

(Configuration of Second Heat Exchanger)

The primary side (the primary side pipe 70*a*) of the second heat exchanger 70 is connected in the middle of the second pipe 50.

A secondary side (a secondary side pipe 70*b*) of the second heat exchanger 70 is connected to the load R.

The second heat exchanger 70 can exchange heat between the primary side and the secondary side.

The secondary side pipe 70*b* of the second heat exchanger 70 and the secondary side pipe 60*b* of the first heat exchanger 60 are connected in series.

(Operation)

An operation of the geothermal heat utilization system 10 of the present embodiment will be described.

First, the case of FIG. 1 (a first mode) will be described.

In the case of FIG. 1, as described above, the first switching unit 22 connects the first storage unit 21 and the first upper opening 23 to each other. Accordingly, the underground water taken in at the first upper opening 23 is pumped to the first pipe 40.

In the case of FIG. 1, as described above, the second switching unit 32 connects the second storage unit 31 and the second lower opening 34 to each other. Accordingly, the underground water taken in at the second lower opening 34 is pumped to the second pipe 50.

Therefore, the geothermal heat utilization system 10 can supply the underground water of the upper aquifer LY1 from the first upper opening 23 to the second upper opening 33 via the first pipe 40.

Further, the geothermal heat utilization system 10 can supply the underground water of the lower aquifer LY2 from the second lower opening 34 to the first lower opening 24 via the second pipe 50.

Therefore, the geothermal heat utilization system 10 can supply storage heat of the upper aquifer LY1 to the first heat exchanger 60, and can supply storage heat of the underground water of the lower aquifer LY2 to the second heat exchanger 70.

Further, the geothermal heat utilization system 10 can store heat (hot heat or cold heat) obtained from the first heat exchanger 60 in the upper aquifer LY1, and can store heat (hot heat or cold heat) obtained from the second heat exchanger 70 in the lower aquifer LY2.

For example, in the case of the present embodiment, the geothermal heat utilization system 10 consumes hot water acquired from the upper aquifer LY1 by supplying the hot water to the first heat exchanger 60 via the first upper opening 23. On the other hand, the geothermal heat utilization system 10 stores cold water acquired in the first heat exchanger 60 by supplying the cold water to the upper aquifer LY1 via the second upper opening 33.

Further, in the case of the present embodiment, the geothermal heat utilization system 10 consumes hot water acquired from the lower aquifer LY2 by supplying the hot water to the second heat exchanger 70 via the second lower opening 34. On the other hand, the geothermal heat utilization system 10 stores cold water acquired in the second heat exchanger 70 by supplying the cold water to the lower aquifer LY2 via the first lower opening 24.

Here, "hot water" refers to water having a temperature higher than the initial underground temperature of the underground water in each aquifer, and "cold water" refers to water having a temperature lower than the initial underground temperature of the underground water in each aquifer.

For example, the initial underground temperature of the underground water in each aquifer is 18° C.

Next, the case of FIG. 2 (a second mode) will be described. FIG. 2 shows a state in which the internal pipes of the first switching unit 22 and the second switching unit 32 are switched from the connection shown by a solid line in FIG. 1 to the connection shown by a dotted line in FIG. 1.

In this case, the first switching unit 22 connects the second pipe 50 and the first upper opening 23 to each other by connecting the second port 22*b* and the third port 22*c* to each other.

Further, the first switching unit 22 connects the first storage unit 21 and the first lower opening 24 to each other by connecting the first port 22*a* and the fourth port 22*d* to each other.

Further, the second switching unit 32 connects the second storage unit 31 and the second upper opening 33 to each other by connecting the first port 32*a* and the third port 32*c* to each other.

Further, the second switching unit 32 connects the first pipe 40 and the second lower opening 34 to each other by connecting the second port 32*b* and the fourth port 32*d* to each other.

Accordingly, the underground water taken in at the first lower opening 24 is pumped to the first pipe 40, and the underground water taken in at the second upper opening 33 is pumped to the second pipe 50.

Therefore, the geothermal heat utilization system 10 can supply the underground water of the lower aquifer LY2 from the first lower opening 24 to the second lower opening 34 via the first pipe 40.

Further, the geothermal heat utilization system 10 can supply the underground water of the upper aquifer LY1 from the second upper opening 33 to the first upper opening 23 via the second pipe 50.

Therefore, the geothermal heat utilization system 10 can supply storage heat (hot heat or cold heat) of the lower aquifer LY2 to the first heat exchanger 60, and can supply storage heat (hot heat or cold heat) of the upper aquifer LY1 to the second heat exchanger 70.

Further, the geothermal heat utilization system 10 can store heat (hot heat or cold heat) obtained from the first heat exchanger 60 in the lower aquifer LY2, and can store heat (hot heat or cold heat) obtained from the second heat exchanger 70 in the upper aquifer LY1.

For example, in the case of the present embodiment, the geothermal heat utilization system 10 consumes cold water acquired from the upper aquifer LY1 by supplying the cold water to the second heat exchanger 70 via the second upper opening 33. On the other hand, the geothermal heat utilization system 10 stores hot water acquired in the second heat exchanger 70 by supplying the hot water to the upper aquifer LY1 via the first upper opening 23.

Further, in the case of the present embodiment, the geothermal heat utilization system 10 consumes cold water acquired from the lower aquifer LY2 by supplying the cold water to the first heat exchanger 60 via the first lower opening 24. On the other hand, the geothermal heat utilization system 10 stores hot water acquired in the first heat exchanger 60 by supplying the hot water to the lower aquifer LY2 via the second lower opening 34.

(Operational Effects)

The geothermal heat utilization system 10 of the present embodiment can supply the underground water of the upper aquifer LY1 and the underground water of the lower aquifer LY2 separately, and thus can prevent the underground water of the upper aquifer LY1 and the underground water of the lower aquifer LY2 from being mixed with each other.

Thus, in the geothermal heat utilization system 10 of the present embodiment, blockage of the well is prevented when the upper aquifer LY1 and the lower aquifer LY2 are used.

For example, in a case in which the underground water of the upper aquifer LY1 is rich in oxygen and the underground water of the lower aquifer LY2 is rich in iron, when the underground water of the upper aquifer LY1 and the underground water of the lower aquifer LY2 are mixed with each other, iron oxide is produced and the strainer of the opening of each well is blocked.

On the other hand, the geothermal heat utilization system 10 of the present embodiment has a structure in which the underground water of the upper aquifer and the underground water of the lower aquifer are unlikely to be mixed with each other, and thus can prevent the blockage of the well when the upper aquifer LY1 and the lower aquifer LY2 are used.

Further, the geothermal heat utilization system 10 of the present embodiment can reversely supply the heat stored by water supplying in each of the upper aquifer LY1 and the lower aquifer LY2. Therefore, the heat stored by water supplying can be used.

Further, in the geothermal heat utilization system 10 of the present embodiment, the first pump 21a can pump the underground water of the upper aquifer LY1 in the first mode and can pump the underground water of the lower aquifer LY2 in the second mode. Similarly, in the geothermal heat utilization system 10 of the present embodiment, the second pump 31a can pump the underground water of the upper aquifer LY1 in the second mode and can pump the underground water of the lower aquifer LY2 in the first mode. Therefore, each pump can be used depending on the mode, and the utilization efficiency of each pump can be improved.

Further, in the geothermal heat utilization system 10 of the present embodiment, it is possible to pump and circulate the underground water of the upper aquifer LY1 and it is possible to pump and circulate the underground water of the lower aquifer LY2.

Therefore, a heat storage capacity can be doubled as compared with the geothermal heat utilization system in which the underground water of one aquifer is pumped and returned.

Further, in the geothermal heat utilization system 10 of the present embodiment, the first upper opening 23 and the first lower opening 24 are arranged vertically, and the second upper opening 33 and the second lower opening 34 are arranged vertically, and thus a site area can be effectively used.

Particularly, in urban areas where high-rise buildings with high heat demand are concentrated, it is necessary to equip a large-capacity heat source system, but the site area is limited, and thus the geothermal heat utilization system 10 of the present embodiment is effective. For example, according to the geothermal heat utilization system 10 of the present embodiment, it is possible to utilize the storage heat of the aquifer by using the heat utilization potential of the underground water widely existing in the alluvial plain common to metropolitan areas.

Further, in the geothermal heat utilization system 10 of the present embodiment, the underground water of the upper aquifer LY1 is supplied from the first upper opening toward the second upper opening 33 while the underground water of the lower aquifer LY2 is supplied from the second lower opening 34 toward the first lower opening 24.

That is, in each well, the water is pumped from one aquifer while the water is circulated to the other aquifer.

Therefore, the geothermal heat utilization system 10 of the present embodiment can prevent ground subsidence and ground rise.

Second Embodiment

A second embodiment of a geothermal heat utilization system according to the present invention will be described with reference to FIGS. 3 to 10.

According to a geothermal heat utilization system 100 of the second embodiment, for example, in the geothermal heat utilization system 10 of the first embodiment, hot water is stored in only one of the upper aquifer LY1 and the lower aquifer LY2 in the summer, and cold water is stored in only the other of the upper aquifer LY1 and the lower aquifer LY2 in the winter.

Here, the "hot water" refers to water having a temperature higher than the initial underground temperature of the underground water in each aquifer, and the "cold water" refers to water having a temperature lower than the initial underground temperature of the underground water in each aquifer. In the present embodiment, it is assumed that the initial underground temperature of the underground water in each aquifer is 18° C.

Unless otherwise specified, each component of the geothermal heat utilization system 100 of the second embodiment is configured in the same manner and has the same function as each component of the geothermal heat utilization system 10 of the first embodiment, and thus the duplicate explanation will be omitted.

The temperatures shown in FIGS. 3 to 6 indicate the temperature of the refrigerant (including underground water) in each portion.

The arrows shown in FIGS. 3 to 6 indicate the flow of a refrigerant (including underground water) in each portion.

In the geothermal heat utilization system 100 of the present embodiment, hot water is stored in the upper aquifer LY1 in the summer, and cold water is stored in the lower aquifer LY2 in the winter.

(Winter Operation Start Time)

Figure 3:
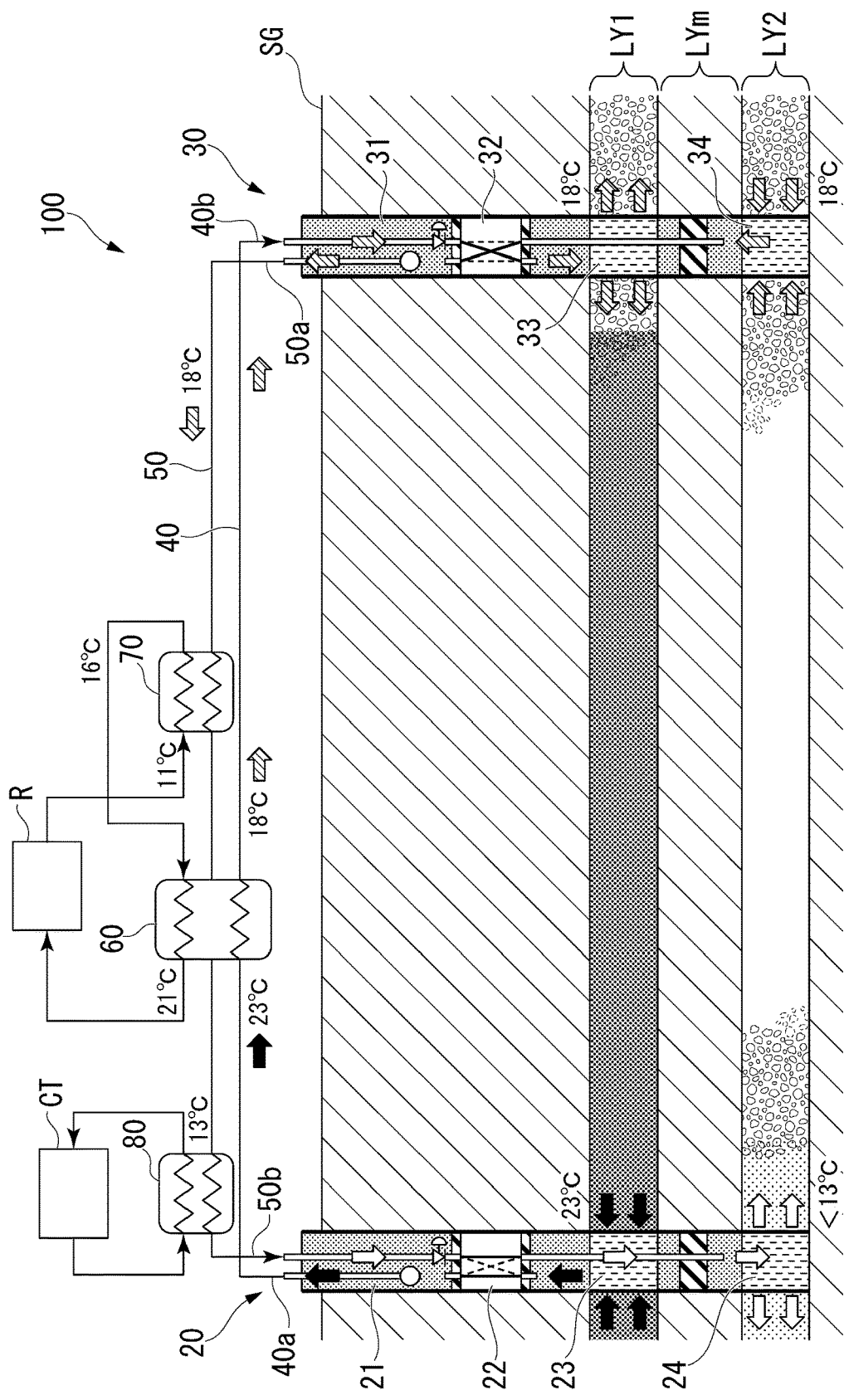
FIG. 3 is a system diagram of a geothermal heat utilization system according to a second embodiment of the present invention.

As shown in FIG. 3, first, as an initial state, at the winter operation start time, the geothermal heat utilization system 100 stores hot water stored in the summer in the upper aquifer LY1 of the underground.

The geothermal heat utilization system 100 operates as follows in a winter mode during the winter.

As shown in FIG. 3, in the winter mode, the first switching unit 22 connects the first storage unit 21 and the first upper opening 23 to each other and connects the second pipe 50 and the first lower opening 24 to each other.

Further, the second switching unit 32 connects the second storage unit 31 and the second lower opening 34 to each other and connects the first pipe 40 and the second upper opening 33 to each other.

Accordingly, the underground water taken in at the first upper opening 23 is pumped to the first pipe 40.

Further, the underground water taken in at the second lower opening 34 is pumped to the second pipe 50.

Therefore, in the winter mode, the geothermal heat utilization system 100 can supply the underground water of the upper aquifer LY1 from the first upper opening 23 to the second upper opening 33 via the first pipe 40.

Further, in the winter mode, the geothermal heat utilization system 100 can supply the underground water of the lower aquifer LY2 from the second lower opening to the first lower opening 24 via the second pipe 50.

Therefore, during the winter, the geothermal heat utilization system 100 supplies hot water of the upper aquifer LY1 to the first heat exchanger 60. On the other hand, the geothermal heat utilization system 100 stores cold water acquired in the second heat exchanger 70 in the lower aquifer LY2.

In the present embodiment, the secondary side of the first heat exchanger 60, the secondary side of the second heat exchanger 70, and the load R are connected in series, and the refrigerant flowing through the load R is circulated in the order of the secondary side of the second heat exchanger 70, the secondary side of the first heat exchanger 60, the load R, the secondary side of the second heat exchanger 70, and so on.

As shown in FIG. 3, the geothermal heat utilization system 100 may further include a third heat exchanger 80 downstream of the second heat exchanger 70. A primary side of the third heat exchanger 80 may be connected to the second pipe 50, and a secondary side of the third heat exchanger 80 may be connected to a cooling tower CT. At that time, the third heat exchanger 80 can exchange heat between the primary side and the secondary side.

For example, the primary side of the third heat exchanger 80 is connected in series with the primary side of the second heat exchanger 70.

Accordingly, the geothermal heat utilization system 100 can further cool the cold water cooled by the second heat exchanger 70, by the third heat exchanger 80, and can store the cold water in the lower aquifer LY2.

In the present embodiment, the geothermal heat utilization system 100 cools the underground water pumped at 23° C. from the upper aquifer LY1 to 18° C. and circulates the underground water in the upper aquifer LY1.

On the other hand, in the present embodiment, the geothermal heat utilization system 100 cools the underground water pumped at 18° C. from the lower aquifer LY2 to less than 13° C. and circulates the underground water in the lower aquifer LY2.

(Winter Operation End Time)

Figure 4:
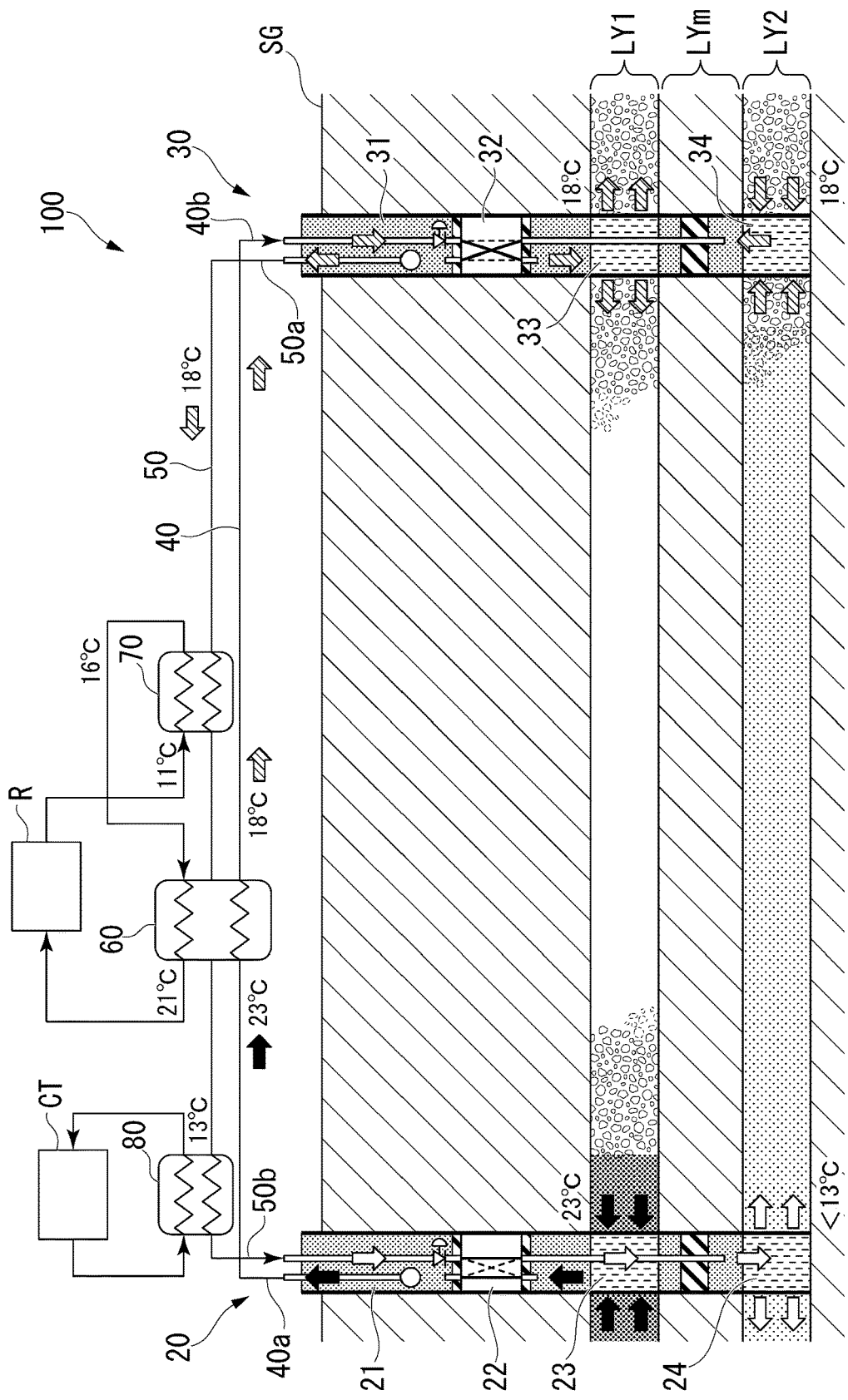
FIG. 4 is a system diagram of the geothermal heat utilization system according to the second embodiment of the present invention.

During the winter, the geothermal heat utilization system 100 operates as shown in FIG. 3, and thus, in the winter operation end time, as shown in FIG. 4, hot water of the upper aquifer LY1 is almost consumed while cold water is stored over a wide area of the lower aquifer LY2.

(Summer Operation Start Time)

Figure 5:
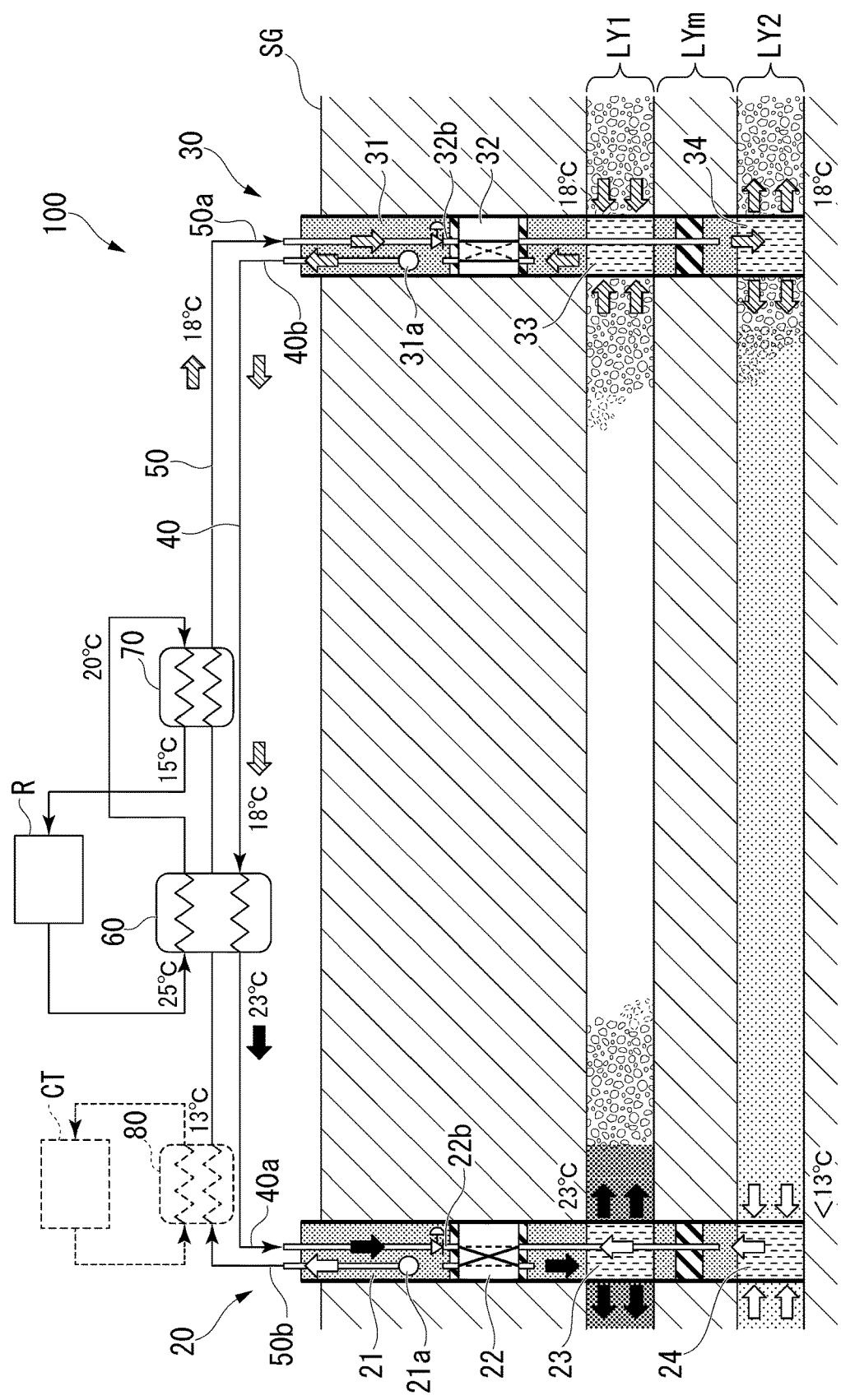
FIG. 5 is a system diagram of the geothermal heat utilization system according to the second embodiment of the present invention.

As shown in FIG. 5, in the summer operation start time, cold water stored in the winter is stored in the lower aquifer LY2.

The geothermal heat utilization system 100 operates as follows in a summer mode during the summer.

As shown in FIG. 5, in the winter mode, first, the connection between each pipe and each well is switched as follows.

That is, the first end 40*a* of the first pipe 40 is connected to the second port 22*b* of the first switching unit 22 such that the water can be supplied toward the second port 22*b* of the first switching unit 22, and the second end 40*b* of the first pipe 40 is connected to the second pump 31*a* such that the water can be pumped from the second pump 31*a* to the first pipe 40.

Further, the first end 50*a* of the second pipe 50 is connected to the second port 32*b* of the second switching unit 32 such that the water can be supplied toward the second port 32*b* of the second switching unit 32, and the second end 50*b* of the second pipe 50 is connected to the first pump 21*a* such that the water can be pumped from the first pump 21*a* to the second pipe 50.

The switching of the connection between each well and the first pipe 40 may be performed outside each well or inside each well.

Similarly, the switching of the connection of the second pipe 50 to each well may be performed outside each well or inside each well.

The flow of the refrigerant flowing through the load R is switched such that the refrigerant is circulated in the order of the secondary side of the first heat exchanger 60, the secondary side of the second heat exchanger 70, the load R, the secondary side of the first heat exchanger 60, and so on.

The first switching unit 22 connects the first storage unit 21 and the first lower opening 24 to each other and connects the first pipe 40 (the second port 22*b* of the first switching unit 22) and the first upper opening 23 to each other.

The second switching unit 32 connects the second storage unit 31 and the second upper opening 33 to each other, and connects the second pipe 50 (the second port 32*b* of the second switching unit 32) and the second lower opening 34 to each other.

Accordingly, the underground water taken in at the first lower opening 24 is pumped to the second pipe 50.

Further, the underground water taken in at the second upper opening 33 is pumped to the first pipe 40.

Therefore, in the summer mode, the geothermal heat utilization system 100 can supply the underground water of the lower aquifer LY2 from the first lower opening 24 to the second lower opening 34 via the second pipe 50.

Further, in the summer mode, the geothermal heat utilization system 100 can supply the underground water of the upper aquifer LY1 from the second upper opening to the first upper opening 23 via the first pipe 40.

Therefore, during the summer, the geothermal heat utilization system 100 supplies cold water of the lower aquifer LY2 to the second heat exchanger 70. On the other hand, the geothermal heat utilization system 100 stores hot water acquired in the first heat exchanger 60 in the upper aquifer LY1.

In the present embodiment, in the summer mode, the third heat exchanger 80 does not exchange heat between the primary side and the secondary side.

In the present embodiment, the geothermal heat utilization system 100 cools the underground water pumped at less than 13° C. from the lower aquifer LY2 to 18° C. and circulates the underground water in the lower aquifer LY2.

On the other hand, in the present embodiment, the geothermal heat utilization system 100 heats the underground water pumped at 18° C. from the upper aquifer LY1 to 23° C. and circulates the underground water in the upper aquifer LY1.

(Summer Operation End Time)

Figure 6:
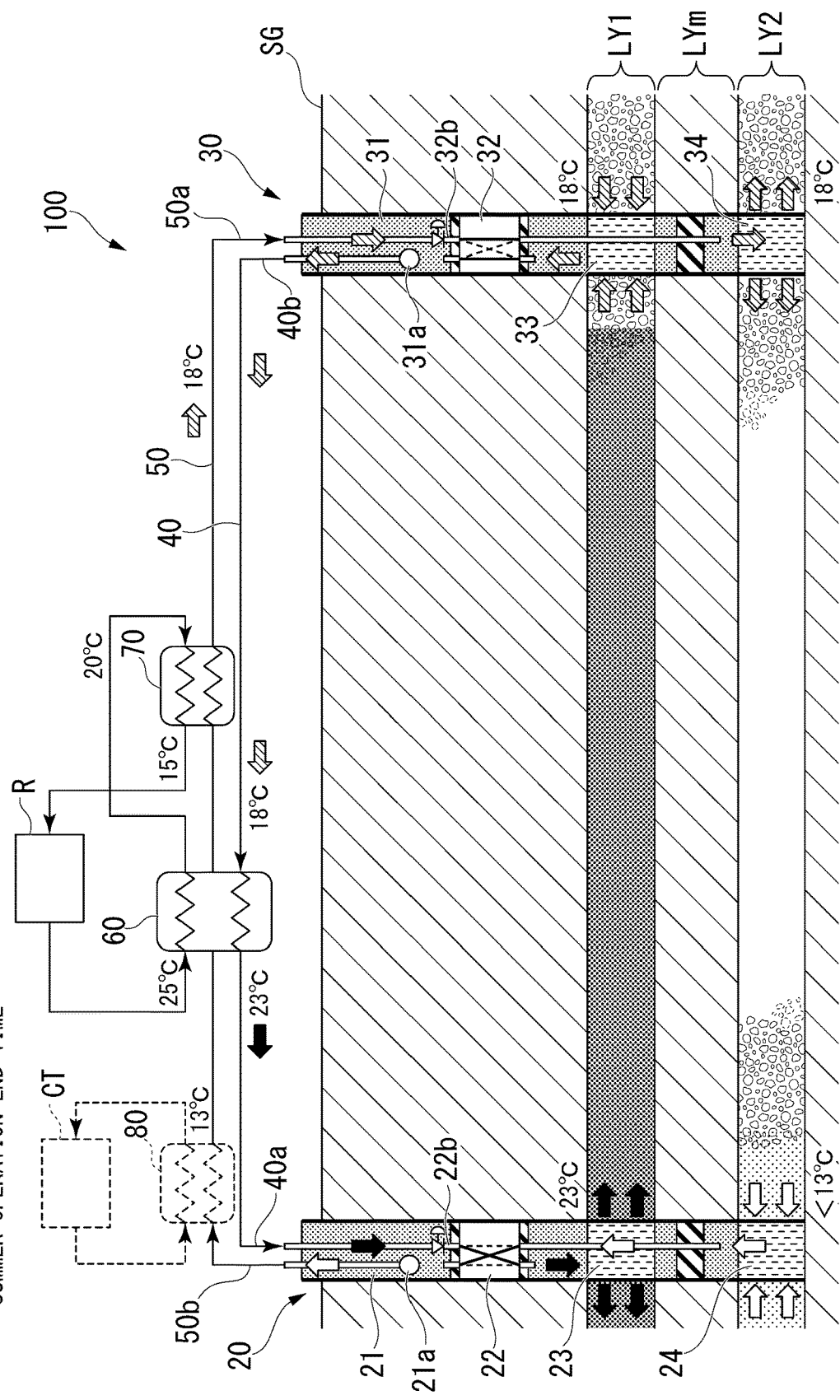
FIG. 6 is a system diagram of the geothermal heat utilization system according to the second embodiment of the present invention.

During the summer, the geothermal heat utilization system 100 operates as shown in FIG. 5, and thus, in the summer operation end time, as shown in FIG. 6, cold water of the lower aquifer LY2 is almost consumed while hot water is stored over a wide area of the upper aquifer LY1.

After that, when the winter operation start time comes again, the geothermal heat utilization system 100 returns to the winter mode.

(Operational Effects)

In addition to the operational effects of the first embodiment, the geothermal heat utilization system 100 of the present embodiment has the following operational effects.

In the geothermal heat utilization system 100 of the present embodiment, hot water is stored in the upper aquifer LY1 in the summer, and cold water is stored in the lower aquifer LY2 in the winter.

That is, in the geothermal heat utilization system 100, hot water and cold water are stored in different aquifers.

Therefore, in the geothermal heat utilization system 100 of the present embodiment, water injection areas of hot water and cold water are unlikely to overlap, and the water injection area of each aquifer can be increased.

Further, the generation of a short circuit is prevented, and thus the geothermal heat utilization system 100 can prevent the heat storage loss.

Here, the geothermal heat utilization system that uses only one of the upper aquifer LY1 and the lower aquifer LY2 is referred to as "S-ATES," the geothermal heat utilization system 10 shown in FIGS. 1 and 2 is referred to as "W-ATES," and the geothermal heat utilization system 100 of the present embodiment is referred to as "QW-ATES."

Figure 8:
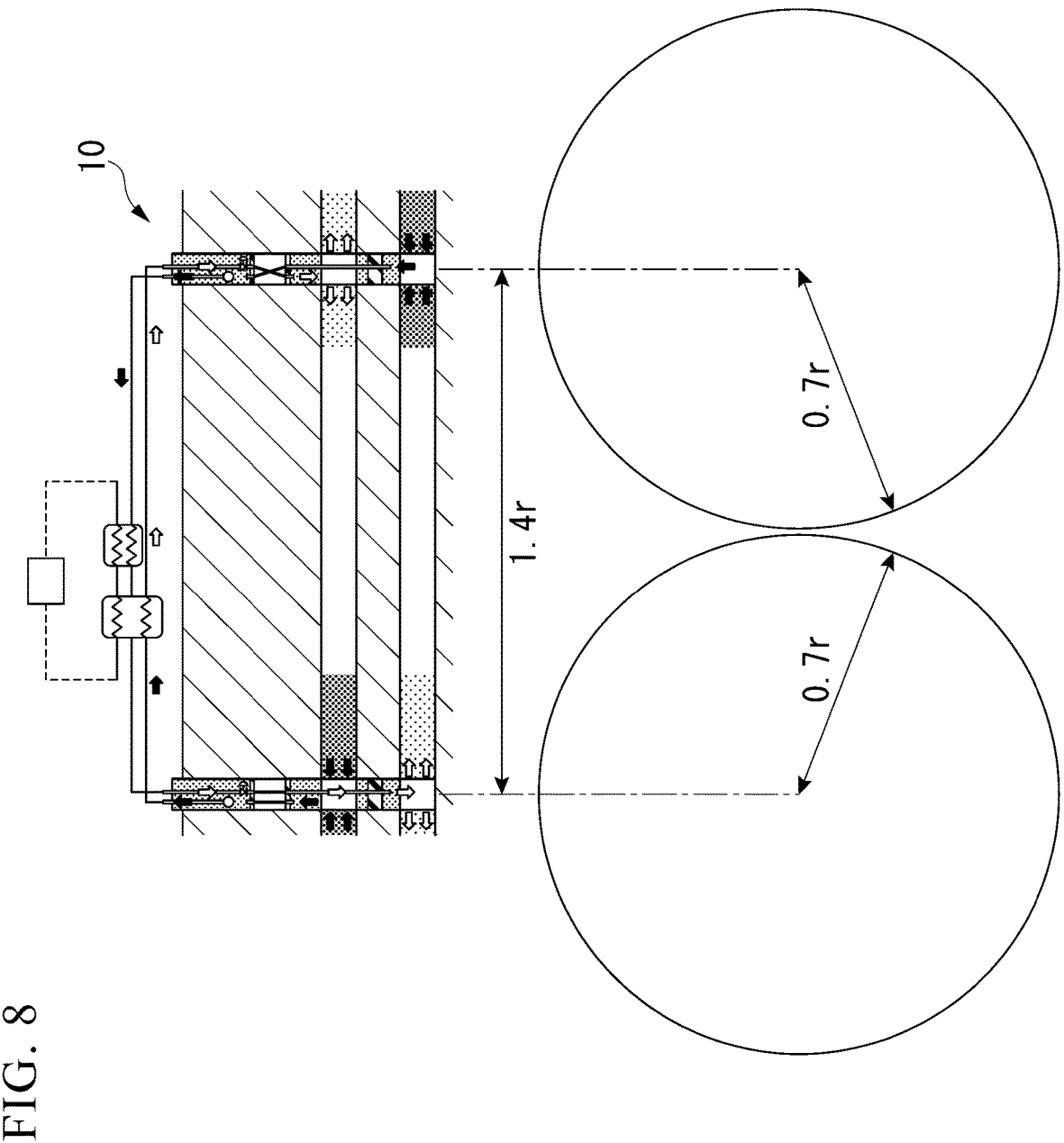
FIG. 8 is a diagram illustrating a period water injection radius and an inter-well distance of W-ATES.

When a cumulative water injection amount for a certain period is set as V and a period water injection radius for S-ATES is set as r (an inter-well distance: 2×r), a heat storage radius for W-ATES is $\sqrt{(1/2)}=0.7$ times. In this case, as shown in FIGS. 7 and 8, the inter-well distance is 1.4×r.

Figure 9:
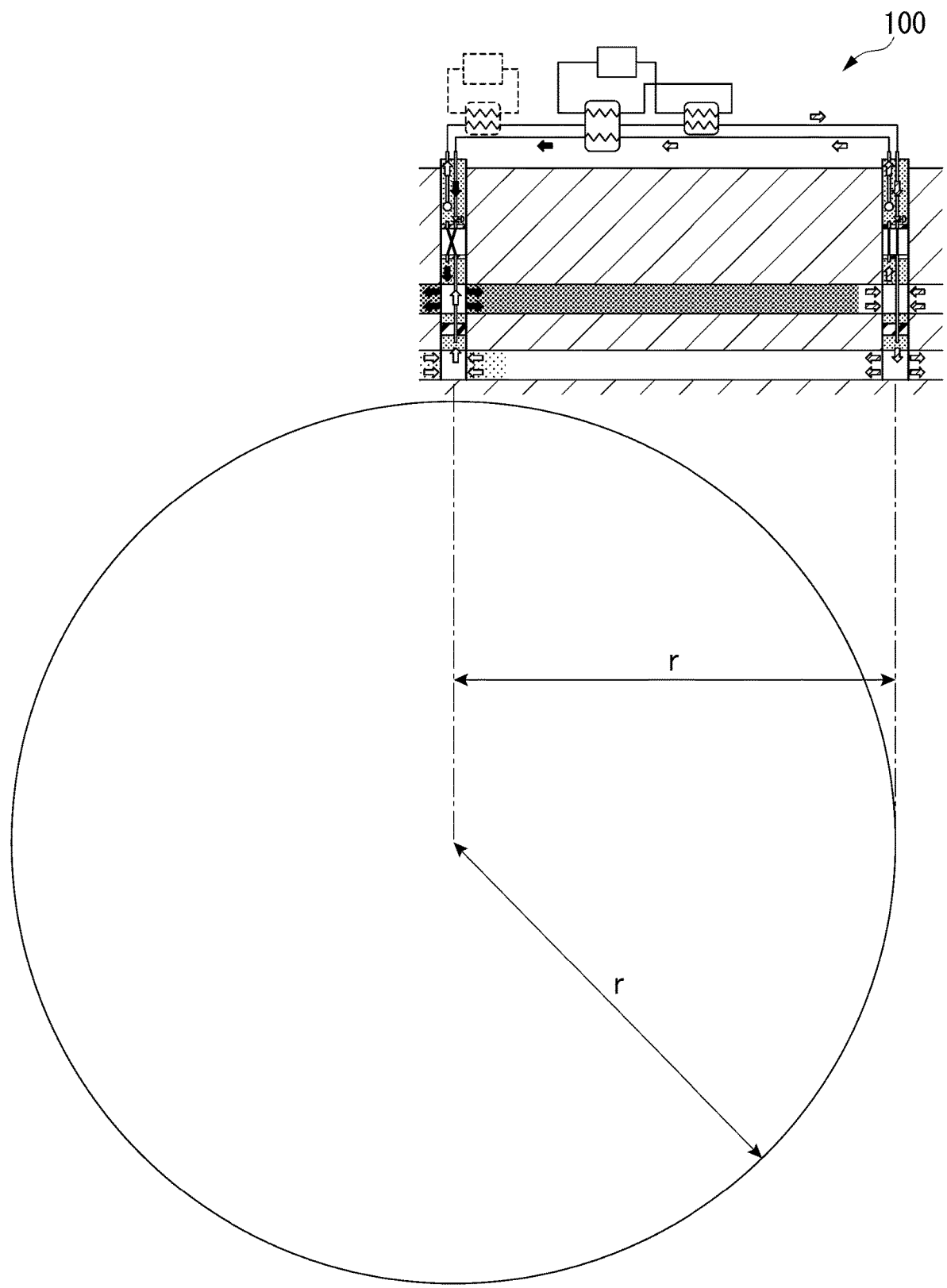
FIG. 9 is a diagram illustrating a period water injection radius and an inter-well distance of QW-ATES.

On the other hand, as shown in FIGS. 7 and 9, in QW-ATES, the period water injection radius is r, but the inter-well distance may also be r.

Figures 10, 11:
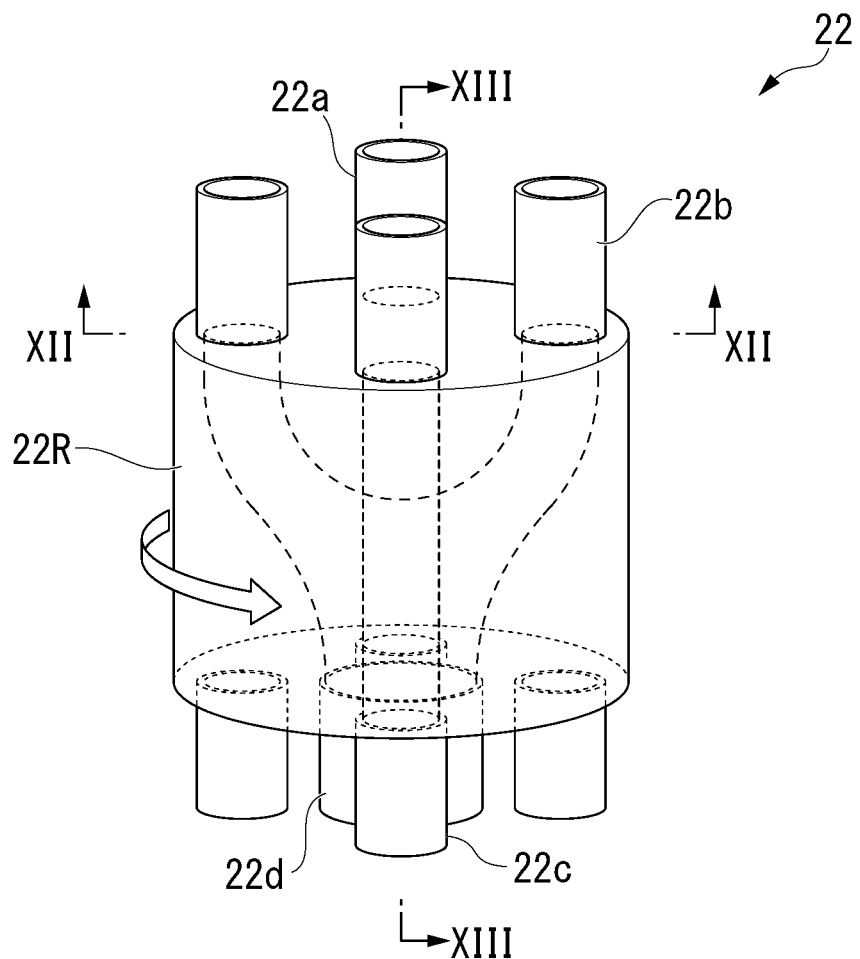
FIG. 10 is a table for comparing a period water injection radius and a period cumulative water injection amount of each type.
FIG. 11 is a perspective view of an example of a switching unit according to each embodiment of the present invention.
Figure 12:
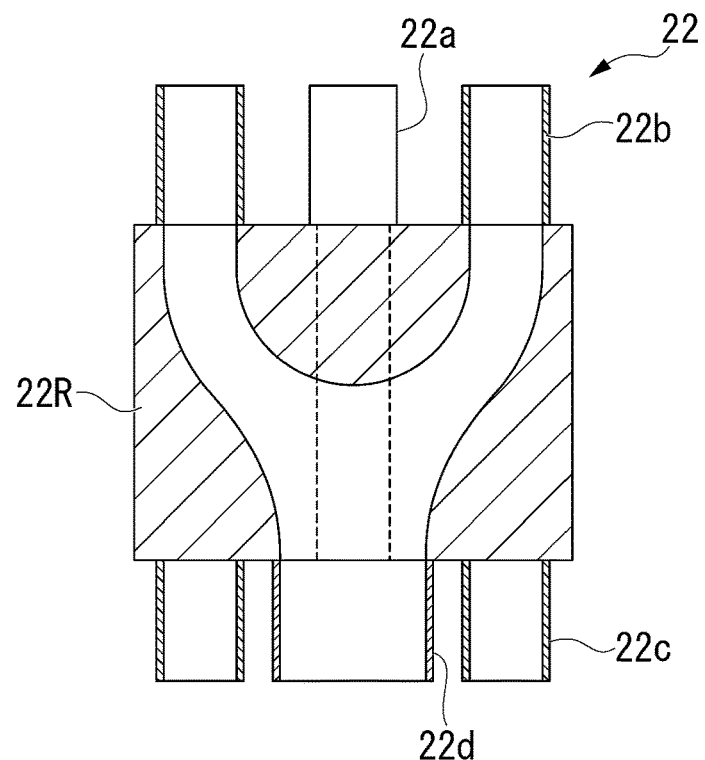
FIG. 12 is a cross-sectional view along line XII-XII of FIG. 11.
Figure 13:
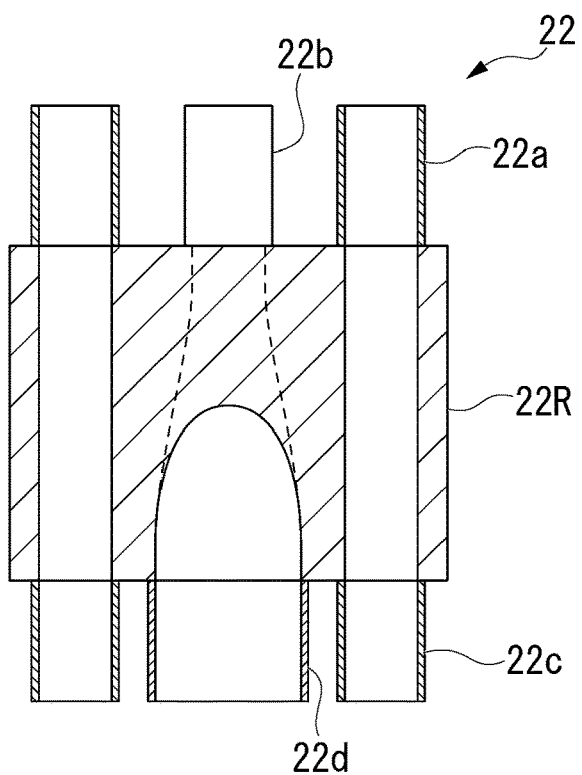
FIG. 13 is a cross-sectional view along line XIII-XIII of FIG. 11.

On the contrary, when the inter-well distance is set in the same condition as the period water injection radius, the period cumulative water injection amount V in the case of QW-ATES is four times as compared with that of the case of S-ATES as shown in FIG. 10. In FIG. 10, s indicates the period cumulative water injection amount V in the case of S-ATES.

The heat storage radius rth and the period water injection radius r do not match each other, and the heat storage radius rth is smaller than the period water injection radius r.

In the geothermal heat utilization system 100 of the present embodiment, hot water is stored in the upper aquifer LY1 and cold water is stored in the lower aquifer LY2, but, as a modification example, cold water may be stored in the upper aquifer LY1 and hot water may be stored in the lower aquifer LY2.

<Example of Switching Unit>

Examples of the first switching unit 22 in each embodiment of the heat utilization system described above are shown in FIGS. 11 to 26. Hereinafter, each example of the first switching unit 22 will be described, but the second switching unit 32 can also have the same configuration.

For example, the first switching unit 22 may include a revolver 22R as shown in FIGS. 11 to 14.

Figure 14:
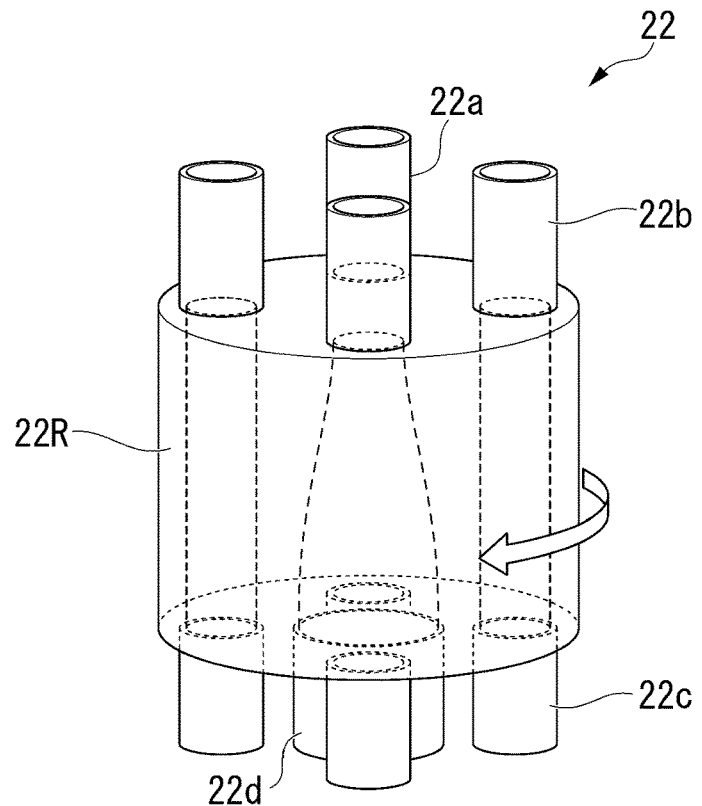
FIG. 14 is a perspective view of an example of a switching unit according to each embodiment of the present invention.

When the revolver 22R is rotated from the state shown in FIG. 11 to the state shown in FIG. 14 by 90°, the first switching unit 22 can change a flow path.

For example, the first switching unit 22 may include a plurality of three-way valves 22T as shown in FIGS. 15 to 18.

When the three-way valves 22T is switched, the first switching unit 22 can change a flow path.

Figure 15:
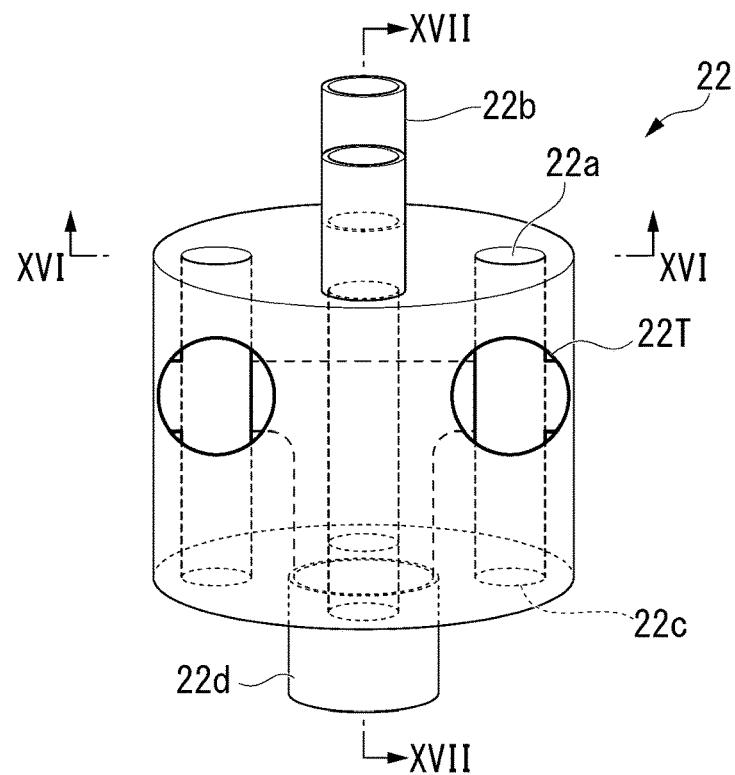
FIG. 15 is a perspective view of an example of a switching unit according to each embodiment of the present invention.
Figure 16:
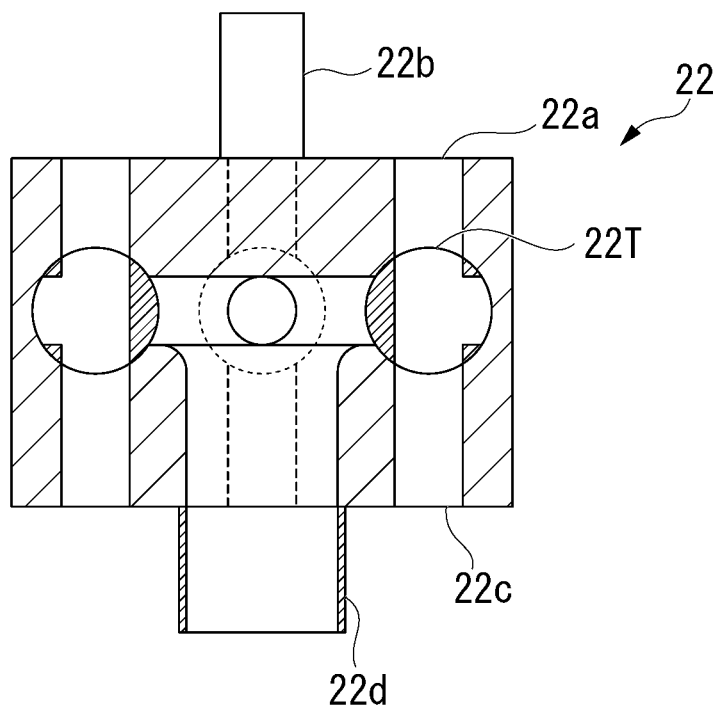
FIG. 16 is a cross-sectional view along line XVI-XVI of FIG. 15.
Figure 17:
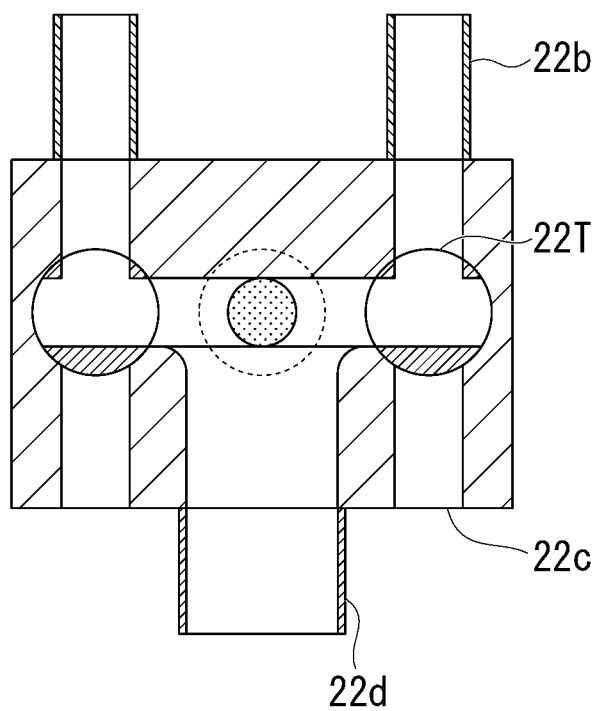
FIG. 17 is a cross-sectional view along line XVII-XVII of FIG. 15.
Figure 18:
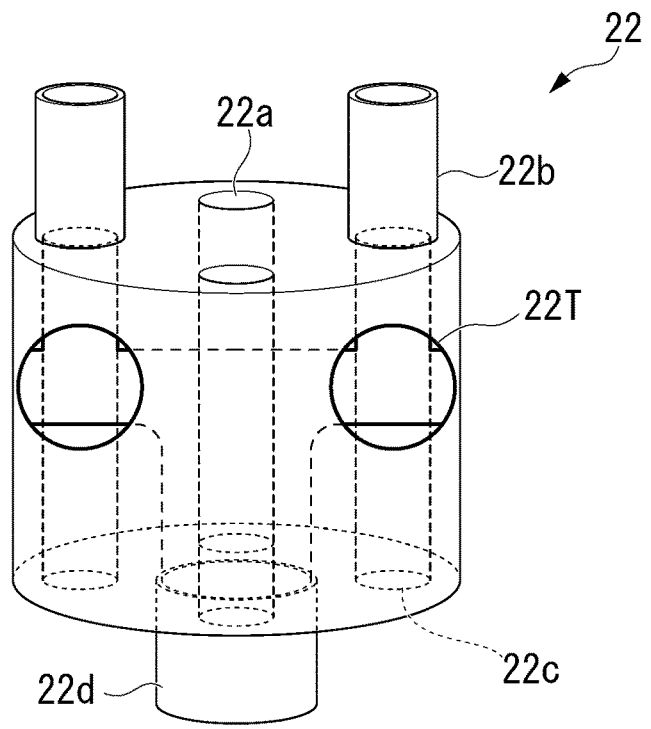
FIG. 18 is a perspective view of an example of a switching unit according to each embodiment of the present invention.

FIG. 15 is a perspective view of the first switching unit 22 when seen from the front, and FIG. 18 is a perspective view of the first switching unit 22 when seen from the side.

The three-way valve 22T may be, for example, a ball valve.

Figure 19:
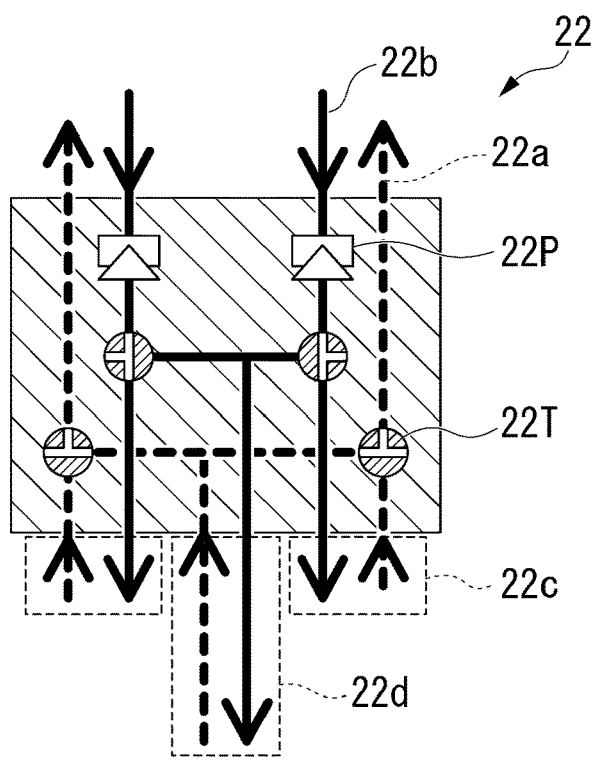
FIG. 19 is a system diagram of an example of a switching unit according to each embodiment of the present invention.

For example, the first switching unit 22 may include a plurality of three-way valves 22T and a plurality of water injection valves 22P as shown in FIG. 19.

When the three-way valves 22T and the water injection valves 22P are switched, the first switching unit 22 can change a flow path.

Figure 20:
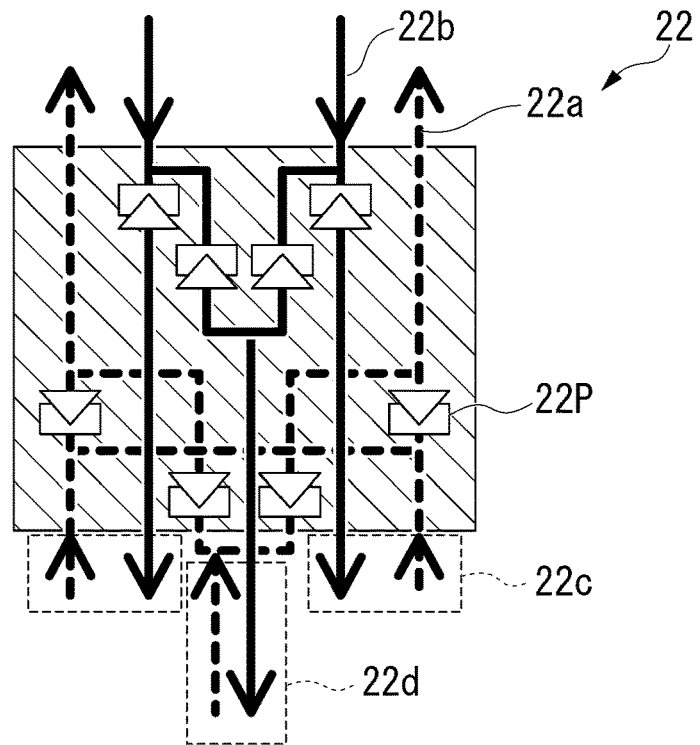
FIG. 20 is a system diagram of an example of a switching unit according to each embodiment of the present invention.
Figure 21:
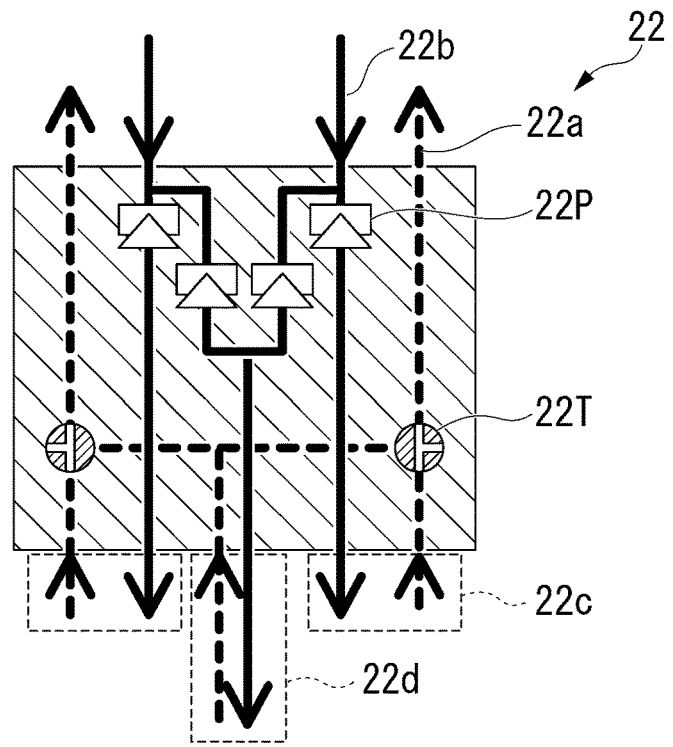
FIG. 21 is a system diagram of an example of a switching unit according to each embodiment of the present invention.

As another example, the first switching unit 22 may be a combination of a plurality of water injection valves 22P as shown in FIG. 20 or a combination of a plurality of three-way valves 22T and a plurality of water injection valves 22P as shown in FIG. 21.

Figure 22:
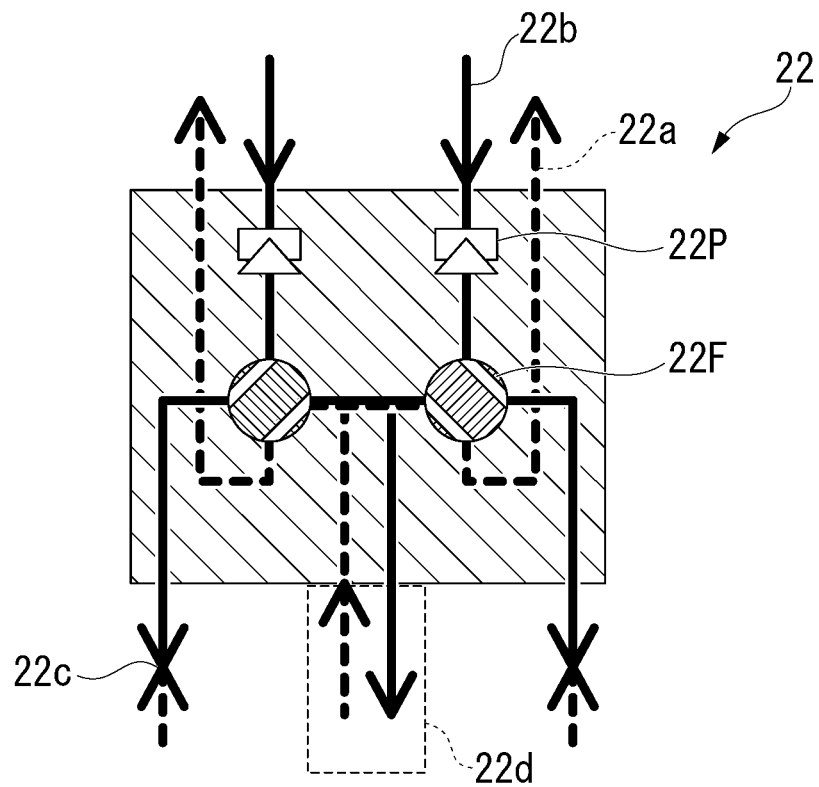
FIG. 22 is a system diagram of an example of a switching unit according to each embodiment of the present invention.

For example, the first switching unit 22 may include a plurality of four-way valves 22F and a plurality of water injection valves 22P as shown in FIG. 22.

When the four-way valves 22F and the water injection valves 22P are switched, the first switching unit 22 can change a flow path.

Figure 23:
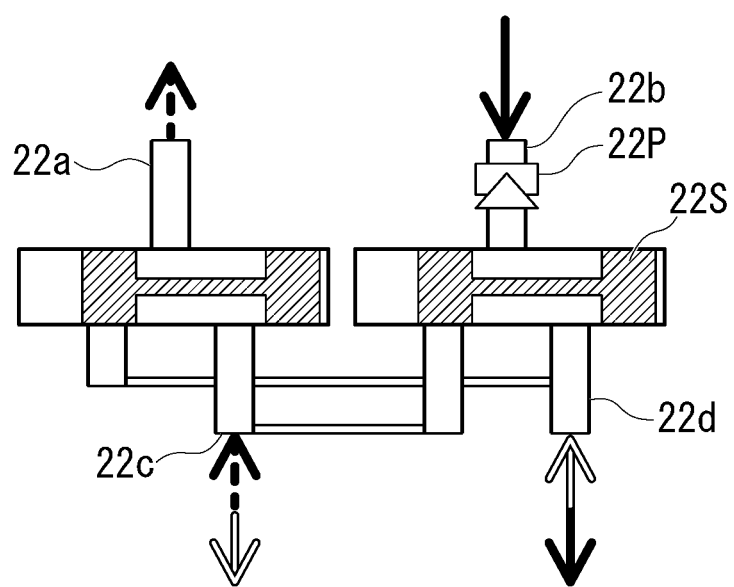
FIG. 23 is a partial cross-sectional view of an example of a switching unit according to each embodiment of the present invention.
Figure 24:
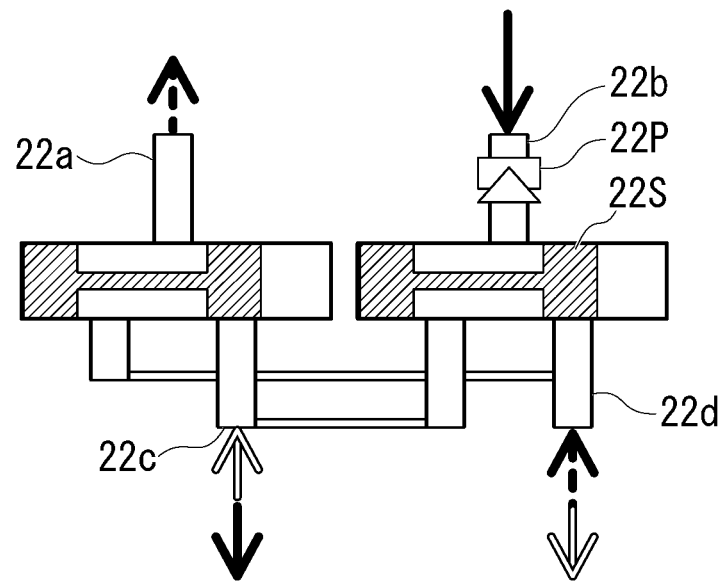
FIG. 24 is a partial cross-sectional view of an example of a switching unit according to each embodiment of the present invention.

For example, the first switching unit 22 may include two slide mechanisms 22S as shown in FIGS. 23 and 24.

When the slide mechanisms 22S are switched from the state shown in FIG. 23 to the state shown in FIG. 24, the first switching unit 22 can change a flow path.

The first switching unit 22 may further include a water injection valve 22P.

Figure 25:
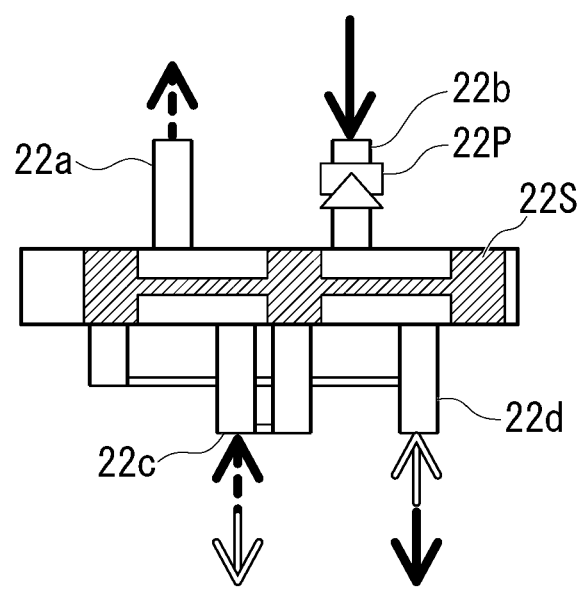
FIG. 25 is a partial cross-sectional view of an example of a switching unit according to each embodiment of the present invention.
Figure 26:
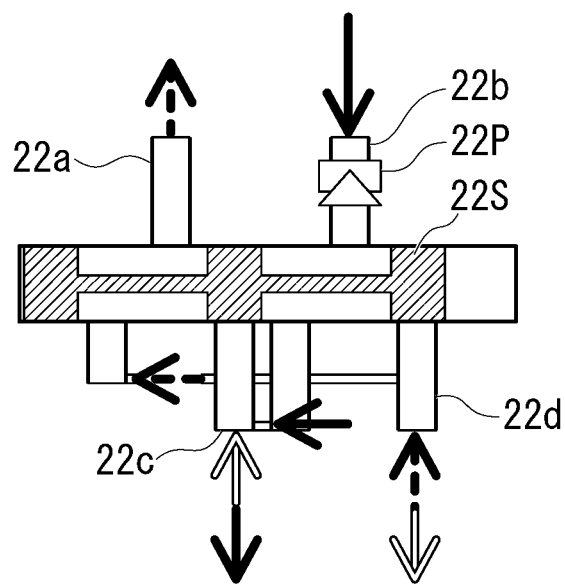
FIG. 26 is a partial cross-sectional view of an example of a switching unit according to each embodiment of the present invention.

As another example, as shown in FIGS. 25 and 26, the first switching unit 22 may have a configuration in which two slide mechanisms 22S are integrated. In this case, when the integrated slide mechanism 22S is switched from the state shown in FIG. 25 to the state shown in FIG. 26, the first switching unit 22 can change a flow path.

<Operation Method for Geothermal Heat Utilization System>

An embodiment of an operation method for the geothermal heat utilization system will be described with reference to FIG. 27.

The present operation method is executed using the geothermal heat utilization system of each of the above-described embodiments.

Figure 27:
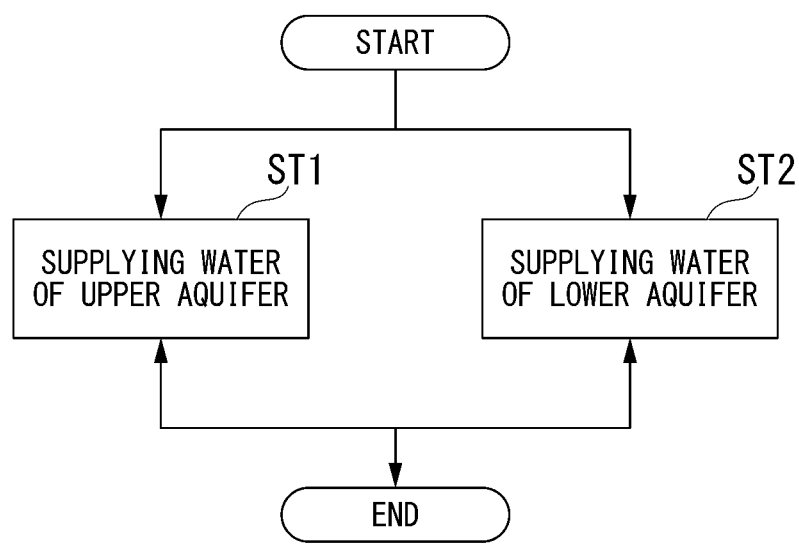
FIG. 27 is a flowchart of an operation method for a geothermal heat utilization system according to each embodiment of the present invention.

First, as shown in FIG. 27, the underground water of the upper aquifer LY1 is supplied from the first upper opening 23 to the second upper opening 33 via the first pipe (ST1: a step of supplying the underground water of the upper aquifer).

At the same time as the execution of ST1, the underground water of the lower aquifer LY2 is supplied from the second lower opening 34 to the first lower opening 24 via the second pipe 50 (ST2: a step of supplying the underground water of the lower aquifer).

Although embodiments of the present invention have been described above, these embodiments are shown as an example and are not intended to limit the scope of the invention. These embodiments can be implemented in various other forms, and various omissions, replacements, and changes can be made without departing from the gist of the invention. These embodiments and modification thereof are included in the scope of the invention described in the claims and the equivalent scope thereof in that they are included in the scope and gist of the invention.

INDUSTRIAL APPLICABILITY

According to one aspect of the present invention, blockage of the well is prevented when the upper aquifer and the lower aquifer are used.

REFERENCE SIGNS LIST

10 Geothermal heat utilization system
20 First well
20a Casing
21 First storage unit
21a First pump
22 First switching unit
22a First port
22b Second port
22c Third port
22d Fourth port
22F Four-way valve
22P Water injection valve
22R Revolver
22S Slide mechanism
22T Three-way valve
23 First upper opening
23a Strainer
24 First lower opening
24a Strainer
30 Second well
30a Casing
31 Second storage unit
31a Second pump
32 Second switching unit
32a First port
32b Second port
32c Third port
32d Fourth port
33 Second upper opening
33a Strainer
34 Second lower opening
34a Strainer
40 First pipe
40a First end
40b Second end
50 Second pipe
50a First end
50b Second end
60 First heat exchanger
60a Primary side pipe
60b Secondary side pipe
70 Second heat exchanger
70a Primary side pipe
70b Secondary side pipe
80 Third heat exchanger
100 Geothermal heat utilization system
CT Cooling tower
HOL1 Excavation hole
HOL2 Excavation hole
LY1 Upper aquifer
LY2 Lower aquifer
LYm Diluvial clay layer
PK Packing
R Load
SG Ground surface

The invention claimed is:

1. A geothermal heat utilization system comprising:
a first well that includes a first upper opening that opens in an upper aquifer and a first lower opening that opens in a lower aquifer;
a second well that includes a second upper opening that opens in the upper aquifer and a second lower opening that opens in the lower aquifer;
a first pipe;
a second pipe;
a first heat exchanger connected to the first pipe; and
a second heat exchanger connected to the second pipe,
wherein the geothermal heat utilization system is capable of supplying underground water of the upper aquifer from the first upper opening to the second upper opening via the first pipe, and
wherein the geothermal heat utilization system is capable of supplying underground water of the lower aquifer from the second lower opening to the first lower opening via the second pipe.

2. The geothermal heat utilization system according to claim 1,
wherein the geothermal heat utilization system is configured to store hot water in one of the upper aquifer and the lower aquifer in summer, and
wherein the geothermal heat utilization system is configured to store cold water in the other of the upper aquifer and the lower aquifer in winter.

3. The geothermal heat utilization system according to claim 1,
wherein the geothermal heat utilization system is further capable of supplying underground water of the upper aquifer from the second upper opening to the first upper opening via the second pipe, and
wherein the geothermal heat utilization system is further capable of supplying underground water of the lower aquifer from the first lower opening to the second lower opening via the first pipe.

4. The geothermal heat utilization system according to claim 1,
wherein the first well further includes:
a first storage unit provided above the first upper opening and including a first pump, and
a first switching unit capable of switching between a mode for connecting the first storage unit and the first upper opening and a mode for connecting the first storage unit and the first lower opening, and
wherein the second well further includes:
a second storage unit provided above the second upper opening and including a second pump, and
a second switching unit capable of switching between a mode for connecting the second storage unit and the second upper opening and a mode for connecting the second storage unit and the second lower opening.

5. An operation method for a geothermal heat utilization system including: a first well that includes a first upper opening that opens in an upper aquifer and a first lower opening that opens in a lower aquifer; a second well that includes a second upper opening that opens in the upper aquifer and a second lower opening that opens in the lower aquifer; a first pipe; a second pipe; a first heat exchanger connected to the first pipe; and a second heat exchanger connected to the second pipe, the method comprising:
supplying underground water of the upper aquifer from the first upper opening to the second upper opening via the first pipe; and
supplying underground water of the lower aquifer from the second lower opening to the first lower opening via the second pipe.

* * * * *